United States Patent
Asai

(10) Patent No.: US 7,301,466 B2
(45) Date of Patent: Nov. 27, 2007

(54) TURN SIGNAL LAMP, PERIPHERY MONITORING DEVICE, BODY CONSTRUCTION AND IMAGING DEVICE FOR VEHICLE

(75) Inventor: Goro Asai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 205 days.

(21) Appl. No.: 10/810,691

(22) Filed: Mar. 29, 2004

(65) Prior Publication Data

US 2004/0201673 A1 Oct. 14, 2004

(30) Foreign Application Priority Data

Apr. 9, 2003 (JP) .............................. 2003-105512

(51) Int. Cl.
*G08B 17/10* (2006.01)

(52) U.S. Cl. .................. 340/632; 340/458; 340/471; 250/330; 315/77

(58) Field of Classification Search ........... 340/632, 340/471, 475, 478, 479, 458, 461; 250/330, 250/341.8, 214, 208.1, 339.05; 315/77, 82, 315/39; 348/148; 362/510; 356/218, 121
See application file for complete search history.

(56) References Cited

U.S. PATENT DOCUMENTS

| | | | | |
|---|---|---|---|---|
| 6,151,065 A * | 11/2000 | Steed et al. | ................ | 348/148 |
| 6,268,685 B1 * | 7/2001 | Stark et al. | ................ | 313/112 |
| 6,377,191 B1 * | 4/2002 | Takubo | ................ | 340/937 |
| 6,667,471 B2 * | 12/2003 | Bos et al. | ................ | 250/208.1 |
| 6,730,913 B2 * | 5/2004 | Remillard et al. | ........ | 250/341.8 |
| 6,774,988 B2 * | 8/2004 | Stam et al. | ................ | 356/218 |
| 6,809,479 B2 * | 10/2004 | Shimomura et al. | .......... | 315/39 |
| 6,827,473 B2 * | 12/2004 | Kobayashi | ................ | 362/510 |
| 6,896,396 B2 * | 5/2005 | Yagi | ................ | 362/510 |
| 7,093,965 B2 * | 8/2006 | Veldman | ................ | 362/494 |
| 7,132,654 B2 * | 11/2006 | Moisel | ................ | 250/330 |

FOREIGN PATENT DOCUMENTS

| | | |
|---|---|---|
| JP | A-62-23843 | 1/1987 |
| JP | Y2-5-41087 | 10/1993 |
| JP | A-2000-7764 | 1/2000 |
| JP | A 2000-316149 | 11/2000 |
| JP | A 2001-057676 | 2/2001 |
| JP | A 2001-097117 | 4/2001 |
| JP | A 2002-240629 | 8/2002 |
| JP | A 2002-254985 | 9/2002 |
| JP | A 2002-264725 | 9/2002 |
| JP | A 2002-308013 | 10/2002 |
| JP | A-2002-308014 | 10/2002 |
| JP | A-2004-299557 | 10/2004 |

* cited by examiner

*Primary Examiner*—Davetta W. Goins
(74) *Attorney, Agent, or Firm*—Oliff & Berridge, PLC

(57) ABSTRACT

A side turn signal light that flashes during operation is disposed on a vehicle body side surface of a vehicle. Further, a camera that images a vehicle side zone that includes the side turn signal light in a section thereof, and a near-infrared LED for night-time illumination are respectively housed in a door mirror. A coating that allows visible light component to pass through while reducing near-infrared component is applied to a lamp bulb of the side turn signal light. Alternatively, a film that allows visible light component to pass through while reducing near-infared component is applied to a lens of the side turn signal light.

12 Claims, 7 Drawing Sheets

TURN SIGNAL LAMP, PERIPHERY MONITORING DEVICE, BODY CONSTRUCTION AND IMAGING DEVICE FOR VEHICLE

INCORPORATION BY REFERENCE

The disclosure of Japanese Patent Application NO. 2003-105512 filed on Apr. 9, 2003 including the specification, drawings and abstract is incorporated herein by reference in its entirety.

BACKGROUND OF THE INVENTION

1. Field of the Invention

The invention relates to a vehicle side-turn signal, a vehicle periphery monitoring device, a vehicle body construction, and a vehicle imaging device. More particularly, in order to improve visibility at night, the invention provides a vehicle side turn signal light and a vehicle periphery monitoring device, a vehicle body construction, and a vehicle imaging device that are sensitive to infrared light which are favorable for displaying a shot image on a display screen. This shot image is obtained by imaging a vehicle side zone including the side turn signal light which is provided on a vehicle body side surface.

2. Description of the Related Art

Vehicle camera systems are known, such as that disclosed in Japanese-Patent-Laid-Open Publication No. 2002-240629, that are provided with a camera attached to a mounted vehicle mirror and light emitting means that illuminates a zone that is imaged by the camera. In such systems, the light emitting means automatically emits infrared light when the camera is imaging. The camera does not reduce infrared light component, and is sensitive to infrared light component. Accordingly, the imaged zone is illuminated even at night, or the like, when the imaged zone would otherwise be dark, whereby it is possible to clearly display a shot image from the camera on an on-board monitor. As a result, according to the above system, even at night, or the like, it is possible to ensure the visibility of the blind spot zone that it is difficult for the vehicle driver to see.

Note that, for the camera, art has been disclosed that images the blind spot zone to the vehicle side, including the vehicle body side surface. However, in addition, a side turn signal light is provided on the vehicle body side surface that flashes during operation in order to issue a warning to any individuals to the vehicle side. This side turn signal light is within the imaged zone of the camera. Moreover, infrared light component is included in the light that is emitted by the side turn signal light. Accordingly, with the above configuration, when the light emitting means is emitting light at night and the side turn signal light is flashing, the camera executes imaging of a zone that includes the side turn signal light. In this case, infrared light component which is generated by lighting of the side turn signal light and which is incident on the camera becomes excessive, and thus the side turn signal light in the image of the camera has a dazzling appearance, and the viewability of the image falls substantially.

SUMMARY OF THE INVENTION

An object of the invention is to provide a vehicle side turn signal light, a vehicle periphery monitoring device, a vehicle body construction, and a vehicle imaging device which can realize a dazzle inhibiting effect for a shot image when a side turn signal light included in an imaged zone is lit.

According to a first aspect of the invention a side turn signal light is provided with a lamp bulb that flashes based upon a predetermined flash control, and an infrared light reduction member which reduces infrared light of flashing light emitted by the lamp bulb and which is provided for one of the lamp bulb and a periphery of the lamp bulb.

With the first aspect of the invention, the side turn signal light is provided on a vehicle body side surface of a vehicle, and is included within an imaged zone of an imaging unit which is sensitive to infrared light and which images a vehicle side zone. Infrared light reduction processing is executed for the side turn signal light. Accordingly, when the side turn signal light is lit, infrared light component is not included within the light emitted therefrom. Thus, if the side turn signal light is lit when the imaging unit is imaging the vehicle side zone, it is possible to inhibit infrared light component which is generated by lighting of the side turn signal light and which is incident on a camera of the imaging unit from becoming excessive. Accordingly, it is possible to inhibit the side turn signal light within the shot image that is displayed on the display unit from having a dazzling appearance.

The first aspect may be configured such that the infrared light reduction member is at least one of an infrared light reduction coating that is applied to the lamp bulb, an infrared light reducing film that is attached to a lens that covers the lamp bulb, and an infrared light reducing filter plate that is disposed between the lamp bulb and the lens.

According to a second aspect of the invention, a vehicle periphery monitoring device includes an imaging unit which is sensitive to infrared light and which is disposed such that a vehicle side zone including a side turn signal light provided on a vehicle body side surface can be imaged; a display unit that displays a shot image that is imaged by the imaging unit; and a display control portion that inhibits display on the display unit of the shot image from the imaging unit when the side turn signal light is lit.

With the second aspect, the side turn signal light is provided on the vehicle body side surface of the vehicle, and is included within the imaged zone of the imaging unit which is sensitive to infrared light and which images the vehicle side zone. Display on the display unit of the shot image that is imaged by the imaging unit is stopped in synchronization with lighting of the side turn signal light. Accordingly, even when the side turn signal light is lit, it is possible to inhibit the side turn signal light within the shot image displayed on the display unit from having a dazzling appearance.

The second aspect of the invention may be configured such that the imaging unit closes a shutter provided therein in synchronization with lighting of the side turn signal light. If this configuration is adopted, the imaging unit does not image the vehicle side zone when the side turn signal light is lit, whereby it is possible to inhibit the side turn signal light within the shot image displayed on the display unit from having a dazzling appearance.

Further, the second aspect of the invention may be configured such that the imaging unit is provided with an aperture. The imaging unit may change an aperture size of the aperture in synchronization with flashing of the side turn signal light. If this configuration is adopted, it is possible to change the aperture size of the imaging unit in accordance with an illumination intensity when the side turn signal light is lit. Accordingly, it is possible to inhibit the side turn signal light within the shot image displayed on the display unit from having a dazzling appearance.

Moreover, the second aspect may also be configured such that the vehicule periphery monitoring device is also provided with an illumination portion that illuminates an imaged zone that is imaged by the imaging unit with near-infrared light; and an illumination controle portion that controls illumination of the illuminatoin portion. with this configuration, the illumination control portion may interrupt illumination of the illumination portion when the side turn signal light is lit.

Further, the second aspect may also be configured such the illumination control portion causes the illumination portion to be constantly lit when a head light switch is in an ON state, and if the side turn signal light is lit when the illumination portion is executing illumination, the illumination control portion controls the aperture size of the aperture by closing-down the aperture such that the aperture size accords with a periphery illumination intensity generated by lighting of the illumination portion and lighting of the side turn signal light.

In addition, the second aspect may be configured such that the illumination control portion causes, even if the head light switch is in the ON state, the illumination portion to be extinguished during a period in which the side turn signal light is lit, and controls the aperture size of the aperture such that the aperture size accords with a periphery illumination intensity generated by lighting of the side turn signal light alone.

According to a third aspect of the invention, a vehicle body construction includes an imaging unit which is sensitive to infrared light and which images a vehicle side zone including a side turn signal light provided on a vehicle body side surface; a display unit that displays a shot image that is imaged by the imaging unit; and a shielding portion that shields an optical path that connects the side turn signal light and the imaging unit.

With the third aspect, the side turn signal light is provided on the vehicle body side surface of the vehicle, and is included within an imaged zone of the imaging unit which is sensitive to infrared light and which images the vehicle side zone. The optical path that directly connects the side turn signal light and the imaging unit is shielded by the shielding portion. With this configuration, the imaging unit does not directly image the side turn signal light included within the imaged zone. Accordingly, the side turn signal light itself does not directly appear on the display unit. Thus, even when the side turn signal light is lit, it is possible to inhibit the side turn signal light within the shot image displayed on the display unit from having a dazzling appearance.

Further, the third aspect may be configured such that the shielding portion is provided in at least one of the side turn signal light and the imaging unit.

According to a fourth aspect of the invention, a vehicle imaging device includes an imaging unit which is sensitive to infrared light and which images a vehicle side zone including a side turn signal light provided on a vehicle body side surface; and a polarized filter disposed at a position that makes it possible to block, amongst light that is incident on the imaging unit, light from an imaged area of the side turn signal light.

With the fourth aspect of the invention, the side turn signal light is provided on the vehicle body side surface of the vehicle, and is included within an imaged zone of the imaging device which is sensitive to infrared light and which images the vehicle side zone. The imaging device has the polarized filter that blocks light coming from one part of the imaged zone. The relative positional relationship of the imaging device and the side turn signal light is determined in advance. Accordingly, if the position of the polarized filter is determined so as to correspond with an imaged position of the side turn signal light, light incident from the side turn signal light on the imaging device is blocked. Accordingly, even when the side turn signal light is lit, it is possible to inhibit the side turn signal light within the shot image displayed on the display unit from having a dazzling appearance.

The fourth embodiment may be configured such that the imaging unit is provided on a movable part of the vehicle. Further, the polarized filter may be provided such that, even if the imaging unit is moved in accordance with movement of the movable part of the vehicle, the position of the polarized filter can be moved such that it constantly corresponds with the imaged position of the side turn signal light.

According to a fifth aspect of the invention, a vehicle periphery monitoring device includes imaging means which is sensitive to infrared light and which is disposed such that a vehicle side zone including a side turn signal light provided on a vehicle body side surface can be imaged; display means that displays a shot image that is imaged by the imaging means; and display control means that inhibits display on the display unit of the shot image imaged by the imaging means when the side turn signal light is lit.

According to a sixth aspect of the invention, a vehicle body construction includes imaging means which is sensitive to infrared light and which images a vehicle side zone including a side turn signal light provided on a vehicle body side surface; display means that displays a shot image that is imaged by the imaging means; and shielding means that shields an optical path that connects the side turn signal light and the imaging means.

According to a seventh aspect of the invention, a vehicle imaging device includes imaging means which is sensitive to infrared light and which images a vehicle side zone including a side turn signal light provided on a vehicle body side surface; and polarized filtering means disposed at a position that makes it possible to shield, amongst light that is incident on the imaging means, light from an imaged area of the side turn signal light.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
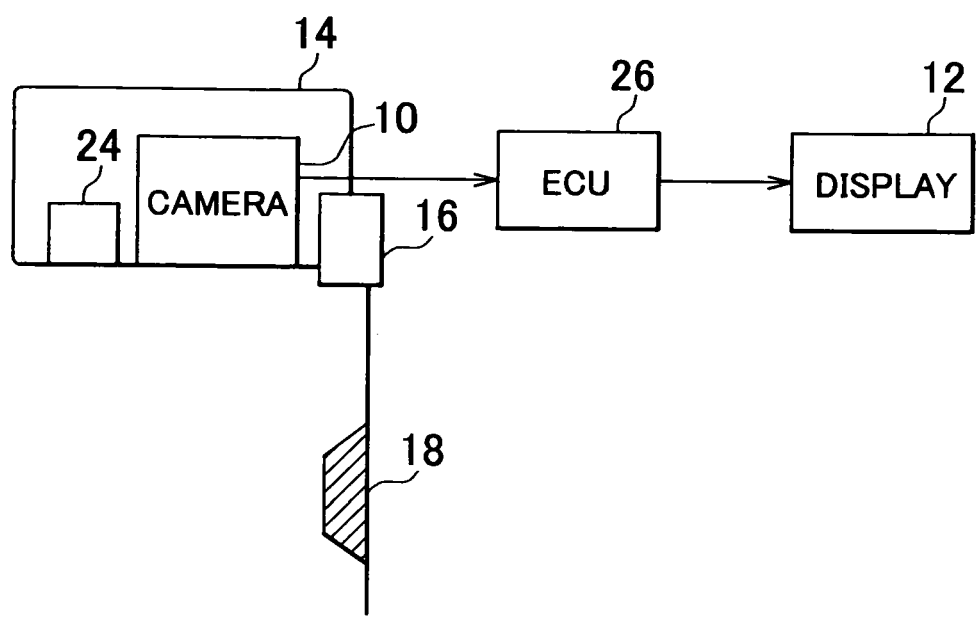
FIG. 1 shows a system configuration of a vehicle periphery monitoring device of the first embodiment of the invention.

FIG. 1 shows a system configuration of a vehicle periphery monitoring device of the first embodiment of the invention. The vehicle periphery monitoring device according to this embodiment is a device that uses a camera mounted on a vehicle to visibly display a vehicle periphery state to a user of the vehicle. According to this embodiment, the vehicle periphery monitoring device is provided with a camera 10 and a display 12.

The camera 10 is provided on a door mirror 14 that is an outer mirror attached to a side door that can be open and shut. This side door is on the opposite side of the vehicle to the driver's seat (note that, the camera 10 may also be provided on the driver's seat side). A mirror storage mechanism 16 is provided in the door mirror 14 that allows an operation position of the door mirror 14 to be changed in accordance with operation of an occupant of the vehicle, or the like. The door mirror 14 is configured such that its operation position can be selectively switched between a deployed position and a stored position, in accordance with operation of the mirror storage mechanism 16. In the deployed position, the door mirror 14 sticks outwards to the side from a vehicle body side surface, as is required for normal running. In the stored position, the door mirror 14 does not protrude from the side, as is required for parking, or the like.

Figure 2:
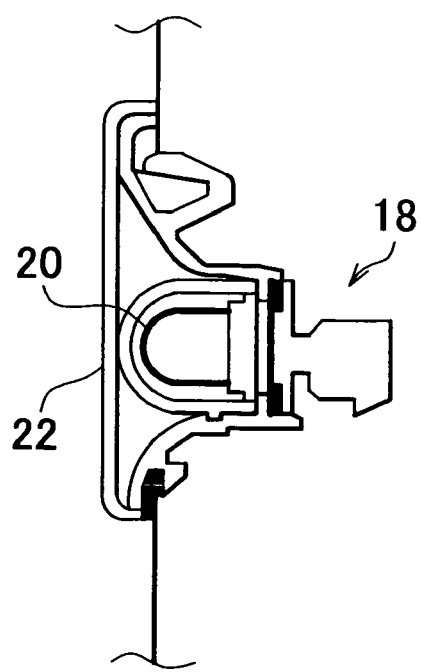
FIG. 2 shows a cross section of a side turn signal light provided in a vehicle in accordance with the first embodiment.
Figure 3:
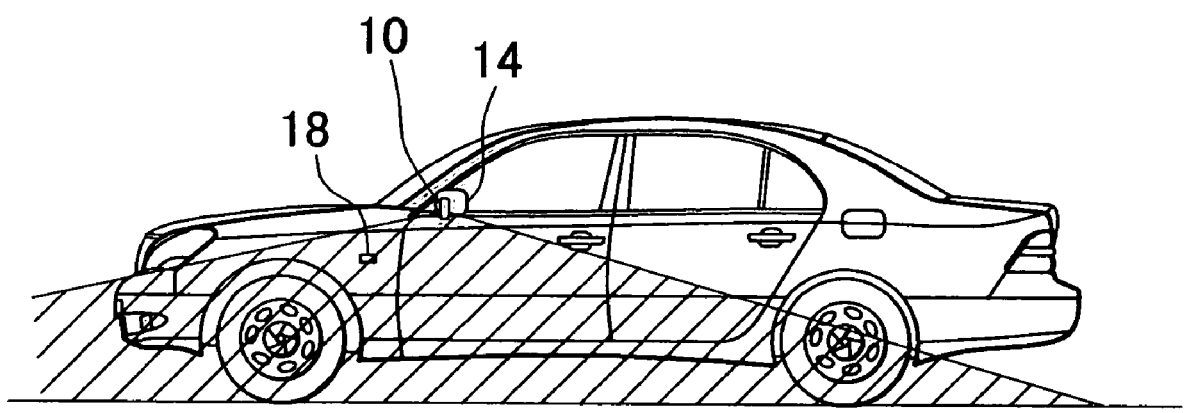
FIG. 3 shows the positional relationship of a camera and the side turn signal light according to the first embodiment.

FIG. 2 shows a cross section of a side turn signal light 18 provided in the vehicle in accordance with this embodiment. Further, FIG. 3 shows the positional relationship of the camera 10 and the side turn signal light 18 according to this embodiment. The side turn signal light 18 is provided on the vehicle body side surface (more specifically, at a front-fender panel rear portion (not shown)). During operation, this side turn signal light 18 generates a flash by being repeatedly lit and extinguished for predetermined time periods, thus issuing a warning to any individuals to the vehicle side. The side turn signal 18 is configured from a lamp bulb 20 that is lit and extinguished, and a lens 22 that encloses the lamp bulb 20.

The camera 10 is configured from a charge-coupled device (CCD), and is sensitive to both visible light component and infrared light component. The camera 10 has an optical axis that points in a door mirror 14 downward direction. Accordingly, the camera 10 images a vehicle side zone (the zone indicated by the diagonal lines in FIG. 3) which is a blind spot zone of the driver that lies along the downward direction and which includes the side turn signal light 18 in one section thereof. In addition, the relative position of the camera 10 with respect to the vehicle body changes along with change in the operation position of the door mirror 14. However, imaging is executed such that respective imaged zones when the door mirror 14 is in the deployed position and the stored position include, at the least, a mutually overlapping section that includes the side turn signal light 18.

A near-infrared Light Emitting Diode (LED) 24 is provided in the vicinity of the camera 10. In conditions when it can be determined that the peripherys of the vehicle are dark based on the fact that headlamps of the vehicle are lit, the near-infrared LED 24 emits near-infrared light in synchronization with imaging of the camera 10. Thus, the imaged zone of the camera 10 is illuminated by infrared light that is shone theretoward.

An electronic control unit (hereinafter referred to as "ECU") 26 is connected to the camera 10. A shot image obtained by imaging of the camera 10 is supplied to the ECU 26. Input of the shot image from the camera 10 to the ECU 26 is executed, for example, every 30 ms. Information about the shot image input to the ECU 26 is temporarily stored in a memory thereof, and a zone for the section that corresponds to the operation position (the deployed position or the stored position) of the door mirror 14 is cut-out.

The aforementioned display 12 is connected to the ECU 26. The display 12 is an indicator display which has a screen of a pre-selected size and which is positioned in a console, or the like, within a passenger compartment such that it can be viewed by the vehicle user. When there is a display request from the vehicle driver, or when the vehicle is in a predetermined running state, or the like, the ECU 26 operates the display 12 such that, from amongst the shot images imaged by the camera 10, the shot image for the zone that is cut-out in accordance with the operation position of the door mirror 14 is displayed on the display 12. Accordingly, the display 12 displays the shot image from the camera 10 that is supplied from the ECU 26.

Figure 4A:
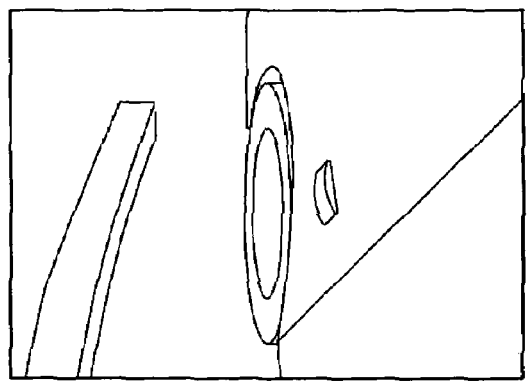
FIG. 4A to 4C show schematic images of respective shot images from the camera according to the first embodiment.
Figure 4B:
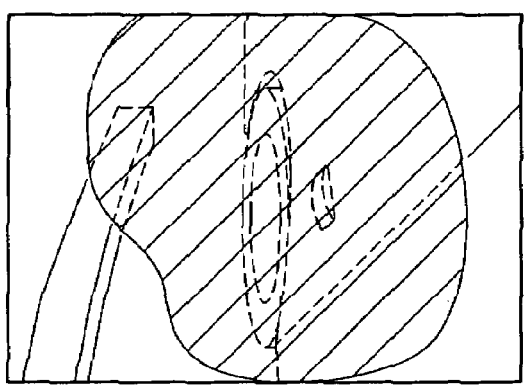
Figure 4C:
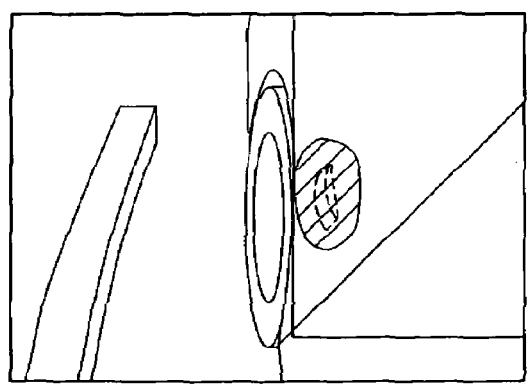

FIGS. 4A to 4C schematically show the shot images from the camera 10 that are displayed on the display 12. Note that, FIG. 4A shows the shot image when the side turn signal light 18 is extinguished; FIG. 4B shows the shot image when the side turn signal light 18 is lit and infrared light removal processing is not executed; and FIG. 4C shows the shot image when the side turn signal light 18 is lit and infrared light removal processing is executed.

With the above described vehicle periphery monitoring device, when the headlamps of the vehicle are lit, the near-infrared LED 24 emits infrared light so as to illuminate the imaged zone of the camera 10. When imaging of the camera 10 is executed in this state, it is possible to image the vehicle side zone that is illuminated by the infrared light. As described above, the camera 10 is sensitive to infrared light component in addition to visible light component. Accordingly, with this embodiment, even at night or the like when the imaged zone is dark, it is possible to obtain image quality for the shot image that is imaged by the camera 10 that is equal to that obtained in the day or the like when the imaged zone is amply lighted, as a result of the near-infrared LED 24. The shot image from the camera 10 is displayed on the display 12, as in FIG. 4A. As a result, with the vehicle periphery monitoring device of this embodiment, it is possible to reliably ensure the visibility of the blind spot zone to the vehicle side that it is difficult for the user to see, even at night or the like.

It should be noted that the side turn signal light 18 that flashes as a result of operation of a turn signal switch or a hazard switch is provided on the vehicle body side surface within the imaged zone of the camera 10. When the side turn signal light 18 is lit, a near-infrared region is included in the light that is radiated therefrom. Accordingly, if the zone including the side turn signal light 18 is imaged as is by the camera 10 while the side turn signal light 18 is lit, the near-infrared component which is generated by lighting of the side turn signal light 18 and which is incident from the lamp bulb 20 onto the camera 10 becomes excessive. Thus, as shown in FIG. 4B, the side turn signal light 18 in the shot image from the camera 10 has a dazzling appearance, and the viewability of the shot image on the display 12 falls substantially.

More particularly, in order to improve the viewability of the camera image at night, it is effective if the sensitivity of the camera 10 to the near-infrared region is raised. However, to the extent that this sensitivity is raised, the near-infrared component that is incident on the camera 10 increases, and thus when the side turn signal light 18 is lit, there is a pronounced worsening of the dazzling appearance.

However, it should be noted that a key characteristic of the system of this embodiment is that, even on occasions when the side turn signal light 18 is lit during night imaging, the side turn signal light 18 included within the imaged zone of the camera image is inhibit from having a dazzling appearance. Hereinafter, this characteristic of the embodiment will be explained.

In the system of this embodiment, the lamp bulb 20 of the side turn signal light 18 is coated around its entire circumference with a coating that reduces near-infrared component while allowing visible light component to pass through. Alternatively, a film that reduces near-infrared component while allowing visible light component to pass through may be applied across the entire surface of the lens 22 of the side turn signal light 18.

With the side turn signal light 18 as configured above, no near-infrared component is included within the light that radiates to the outside from the side turn signal light 18 when it is lit. Given this, the near-infrared component that is incident on the camera 10 from the lamp bulb 20 of the side turn signal light 18 is controlled to a small amount, and it is possible to inhibit the near-infrared component from becoming excessive. If the near-infrared component that is incident on the camera 10 from the side turn signal light 18 is controlled to a small amount, the side turn signal light 18 in the shot image of the camera 10 that is sensitive to the near-infrared region is inhibited from having a dazzling appearance, as shown in FIG. 4C. Accordingly, with the system according to this embodiment, when the side turn signal light 18 included within the image zone of the camera 10 during night imaging is lit, it is possible to achieve a "dazzle inhibiting effect" for the camera image that is displayed on the display 12. Thus, it is possible to maintain good viewability of the camera image for the user of the vehicle, regardless of whether the side turn signal light 18 is lit or extinguished.

With this embodiment, the dazzle inhibiting effect for the camera image is achieved by executing processing such that the near-infrared light of the side turn signal light 18 (more particularly, the lamp bulb 20 and the lens 22 thereof) is reduced. If this near-infrared light reduction processing is executed for the camera 10, the night visibility improvement effect is cancelled out. However, with the above configuration, in order to achieve the dazzle inhibiting effect it is not necessary to carry out any modifications to the camera 10 for the near-infrared light reduction processing, and thus the night visibility improvement effect can be maintained. Accordingly, with the system according to this embodiment, it is possible to realize the dazzle inhibition effect for the camera image when the side turn signal light 18 is lit, while maintaining the visibility improvement effect at night that results from the near-infrared LED 24.

By achieving the dazzle inhibiting effect of the camera image when the side turn signal light 18 is lit in the above manner, it is possible to maintain the dazzle inhibiting effect even if the sensitivity of the camera 10 to infrared component is raised. Thus, according to this embodiment, it is possible to raise the sensitivity of the camera 10 to infrared component amply, whereby it is possible to improve the viewability of the camera image at night.

Further, with this embodiment, the camera 10 is disposed on the door mirror 14 that moves between the operation positions, namely, the deployed position and the stored position. Regardless of whether the door mirror 14 is in the deployed position or the stored position, the side turn signal light 18 is included within the imaged zone of the camera 10. At the same time, in order to achieve the dazzle inhibition effect for the camera image, the near-infrared light reduction processing is executed for the entire side turn signal light 18. Accordingly, even when the position of the side turn signal light 18 in the camera image changes substantially between when the door mirror 14 is in the deployed position and when it is in the stored position, it is possible to reliably inhibit the side turn signal light 18 from having a dazzling appearance in both cases. Note that with this embodiment, it is possible to ensure that the dazzle inhibiting effect for the camera image is achieved, regardless of the operation position of the door mirror 14.

Further, in the above described first embodiment, the camera 10 and the near-infrared LED 24 may be regarded as "imaging means" of the invention. Further, the display 12 may be regarded as "display means" of the invention.

Moreover, although in the first embodiment the near-infrared light reduction processing is executed for the lamp bulb 20 or the lens 22 of the side turn signal light 18, the invention is not limited to this. The near-infrared light reduction processing may be executed for the side turn signal light 18 by interposing a filter, which allows visible light component to pass through while reducing near-infrared component, in the space between the lamp bulb 20 and the lens 22.

Next, a second embodiment of the invention will be explained with reference to FIG. 5.

In the first embodiment described above, in order to achieve the dazzle inhibiting effect for the camera image, the near-infrared light reduction processing is executed for the side turn signal light 18. In contrast to this, in the second embodiment, the dazzle inhibiting effect for the camera image is achieved by shielding an optical path that linearly connects a side turn signal light 18 and the camera 10, instead of by executing the near-infrared light reduction processing of the side turn signal light 18.

Figure 5:
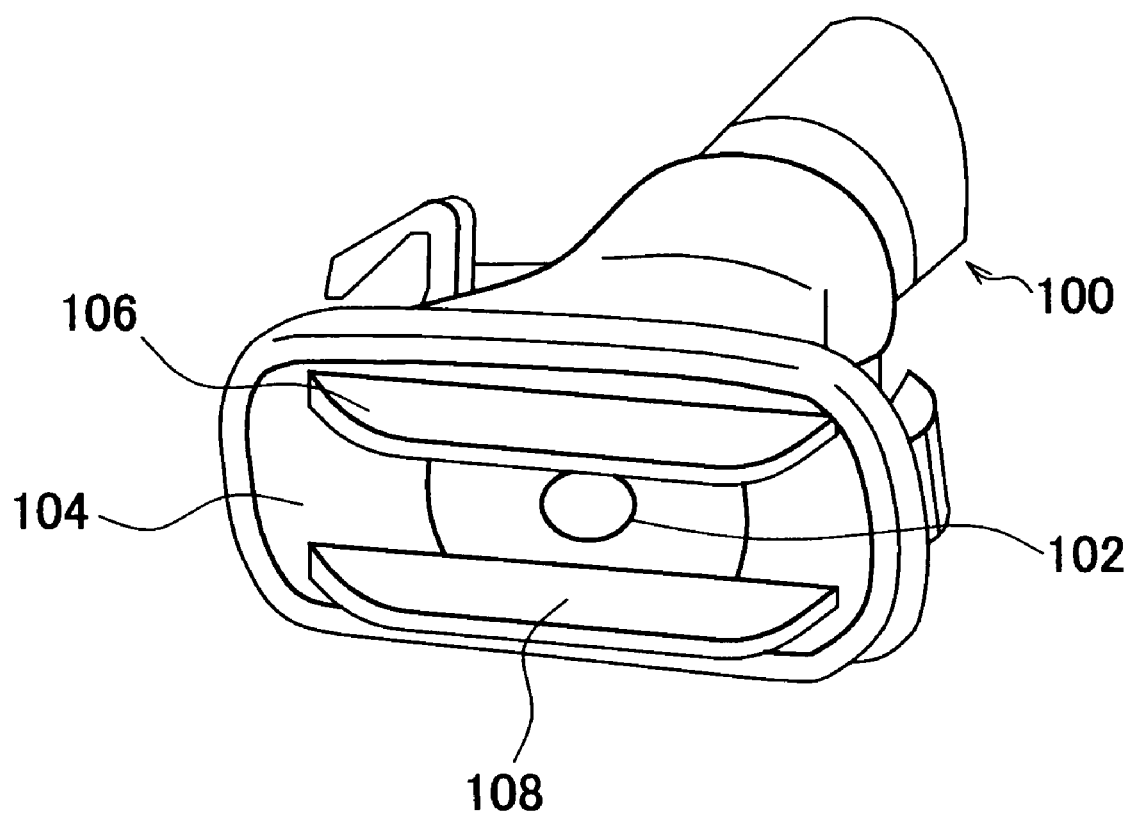
FIG. 5 shows a perspective view of a side turn signal light according to a second embodiment of the invention.

FIG. 5 shows a perspective view of a side turn signal light 100 of this embodiment. Note that, in FIG. 5, structural elements that are the same as those shown in FIGS. 1 and 2 are denoted with the same reference numerals, and thus an explanation thereof is either omitted or simplified. With the system of this embodiment, the side turn signal light 100 is, like the side turn signal light 18, a light which is provided on the vehicle body side surface of the vehicle and which flashes during operation. The side turn signal light 100 has a lamp bulb 102 that is lit and extinguished, and a lens 104 that encloses the lamp bulb 102.

Tabular shielding plates 106 and 108 that protrude horizontally from the surface of the lens 104 are provided on the lens 104. The shielding plate 106 is attached to an upper portion of the lens 104, and the shielding plate 108 is attached to a lower portion of the lens 104. It should be noted that the shielding plate 108 of the lens lower portion is not an essential element of the configuration. The shielding plates 106 and 108 are positioned so as to be on a linear line that connects the lamp bulb 102 of the side turn signal light 100 and the camera 10 disposed on the door mirror 14.

Accordingly, the shielding plates 106 and 108 function so as to shield an optical path that linearly connects the lamp bulb 102 and the camera 10.

With the configuration as described above, when the side turn signal light 100 is lit, light that is radiated from the lamp bulb 102 of the side turn signal light 100 is shielded by the shielding plates 106 and 108. Thus, the light does not reach the camera 10. Given this, the side turn signal light 100 included within the imaged zone is not directly imaged by the camera 10, and thus the side turn signal light 100 itself does not directly appear on the display 12. Accordingly, with the system according to this embodiment, when the side turn signal light 100 is lit during night imaging, the side turn signal light 100 within the shot image displayed on the display 12 does not have a dazzling appearance. Thus, it is possible to achieve the dazzle inhibiting effect for the camera image, and it is possible to obtain the same effects as realized by the first embodiment described above.

In addition, in this embodiment as well, in order to achieve the dazzle inhibiting effect for the camera image it is not necessary to carry out any modifications to the camera 10 for the near-infrared light reduction processing, and at the same time the night viewability improvement effect can be maintained. Accordingly, it is possible to realize the dazzle inhibition effect for the camera image when the side turn signal light 100 is lit, while maintaining the visibility improvement effect at night that results from the near-infrared LED 24.

Note that it is favorable if the shielding plates 106 and 108 function so as to shield the linear optical path to the camera 10 from the lamp bulb 102, without being influenced by the operation position of the door mirror 14. In this regard, with the configuration described above, regardless of whether the door mirror 14 is in the deployed position or the stored position, the light radiated from the lamp bulb 102 of the side turn signal light 100 when it is lit is shielded by the shielding plates 106 and 108. Accordingly, the dazzle inhibiting effect for the camera image can be achieved, regardless of the operation position of the door mirror 14.

Note that in the second embodiment, the shielding plates 106 and 108 are provided for the side turn signal light 100. However, the invention is not limited to this configuration, and a shielding plate may be provided for the camera 10.

Next, a third embodiment of the invention will be described with reference to FIGS. 6 and 7.

Figure 6:
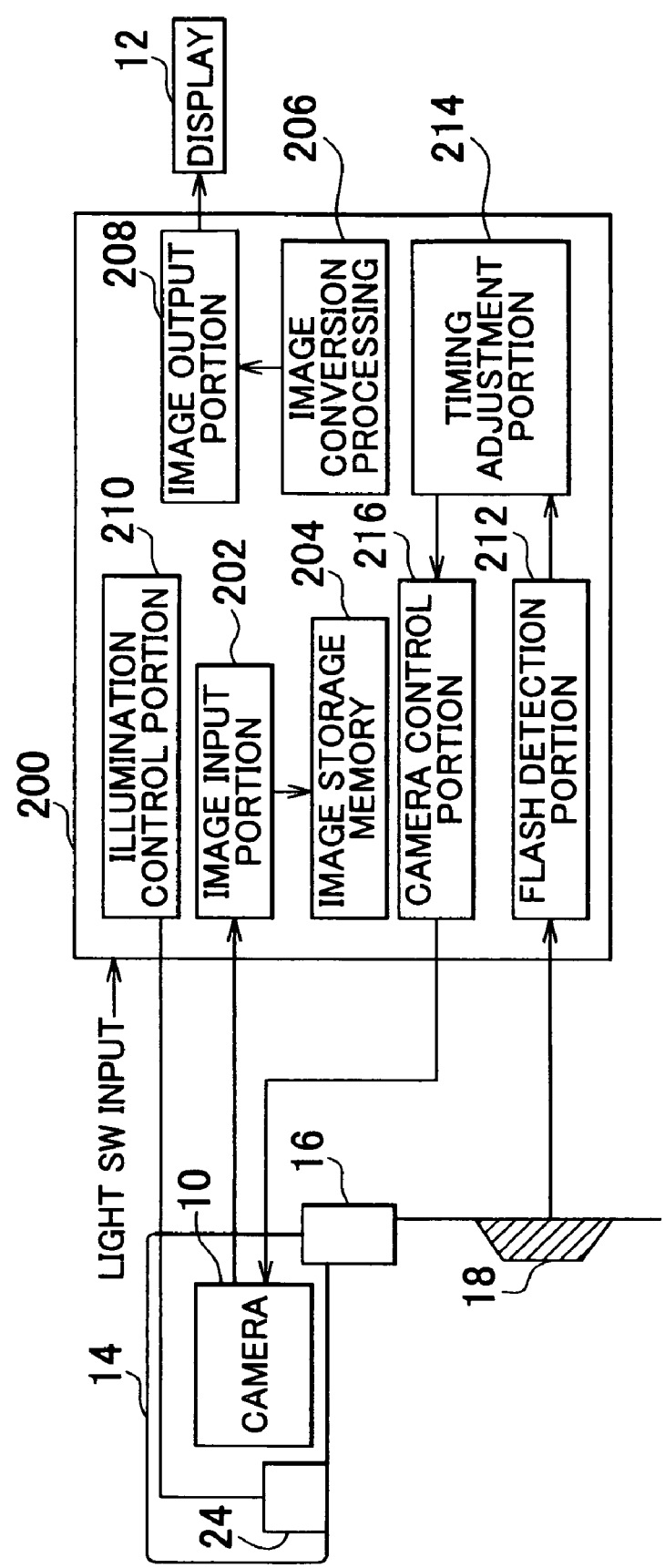
FIG. 6 shows a system configuration of a vehicle periphery monitoring device of a third embodiment of the invention.

FIG. 6 shows a system configuration of a vehicle periphery monitoring device of the third embodiment. In FIG. 6, structural elements that are the same as those shown in FIG. 1 are denoted with the same reference numerals, and thus an explanation thereof is either omitted or simplified. In the system of this embodiment, the camera 10 and the display 12 are respectively connected to an ECU 200.

The ECU 200 has an image input portion 202; an image storage memory 204; an image conversion processing portion 206; and an image output portion 208. The image input portion inputs a shot image obtained by imaging of the camera 10; the image storage memory 204 stores information about the shot image input to the image input portion 202; the image conversion processing portion 206 executes edit-cutting processing of the shot image that is input to the image input portion 202; and the image output portion 208 outputs the shot image obtained by processing of the image conversion processing portion 206 to the display 12.

The ECU 200 also has an illumination control portion 210. The illumination control portion 210 is connected to a head light switch (not shown), that is operated in order to switch a head light (not shown) of the vehicle between a lit state and an extinguished state. The head light is extinguished when the head light switch is OFF, and is lit when the head light switch is ON. The illumination control portion 210 determines whether the head light is lit or not based on whether the head light switch is ON or OFF. Further, the illumination control portion 210 is connected to the near-infrared LED 24. The illumination control portion 210 extinguishes the near-infrared LED 24 when the head light switch is OFF, and lights the near-infrared LED 24 when the head light switch is ON. In other words, the near-infrared LED 24 is lit and extinguishes in synchronization with the head light of the vehicle.

The ECU 200 is also provided with a flash detection portion 212, a timing adjustment portion 214, and a camera control portion 216. The flash detection portion 212 detects whether the side turn signal light 18 is flashing based on the state of the turn signal switch and the hazard switch. When the flash detection portion 212 detects that the side turn signal light 18 is flashing, the timing adjustment portion 214 executes processing to identify a lit period of the side turn signal light 18. The camera control portion 216 electronically controls a shutter (not shown) of the camera 10 such that it opens and closes in synchronization with a flash cycle of the side turn signal light 18. More specifically, the shutter is opened during an extinguished period of the side turn signal light 18, and on the other hand, the shutter is closed during the lit period that is identified by the timing adjustment portion 214.

When the shutter of the camera 10 is open, light is incident on the camera 10, whereas when the shutter is closed, light incident on the camera 10 is blocked. During the period when the light incident on the camera 10 is blocked, the camera 10 does not execute imaging. Accordingly, with this embodiment, while the side turn signal light 18 is flashing, the lit state thereof is not shown in the camera image that is displayed on the display 12. Note that, when the side turn signal light 18 is lit, display is continued of the shot image that was imaged by the camera 10 immediately prior to lighting of the side turn signal lamp 18 on that occasion. Alternatively, the camera image may not be displayed at all.

As a result of this configuration, with the system of this embodiment, when the side turn signal light 18 is lit during night imaging, it is possible to prevent display on the display 12 of a shot image in which the side turn signal light 18 included within the imaged zone of the camera 10 has a dazzling appearance. Accordingly, it is possible to achieve the dazzle inhibiting effect for the camera image that is displayed on the display 12.

Figure 7:
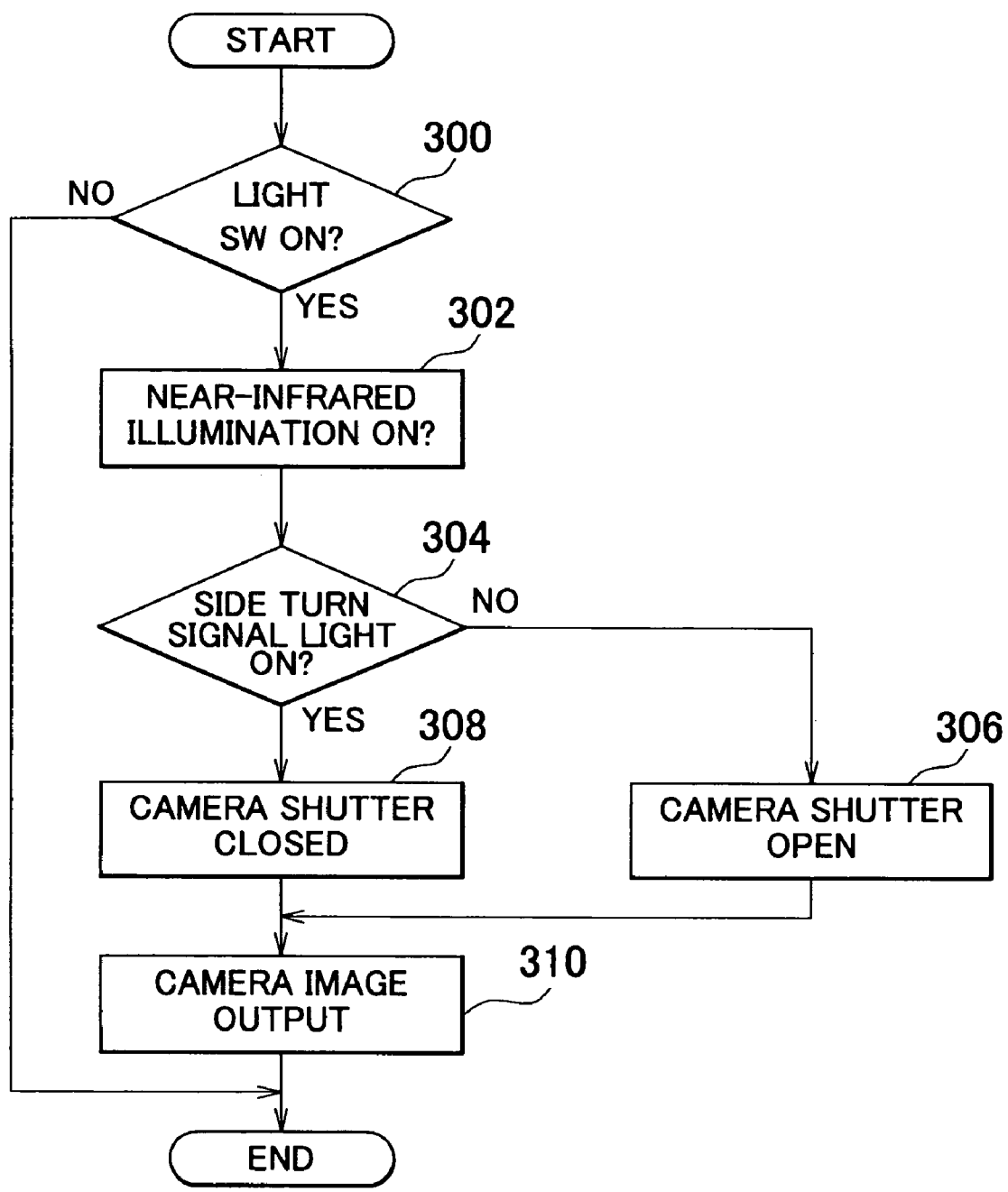
FIG. 7 is a flow chart of a control routine executed by the vehicle periphery monitoring device according to the third embodiment.

FIG. 7 is a flow chart that shows an example of a control routine executed by the ECU 200 of this embodiment in order to achieve the function described above. The routine shown in FIG. 7 is repeatedly started at a predetermined cycle (for example, every 30 ms). When the routine shown in FIG. 7 starts, first, the processing of step 300 is executed.

In step 300, it is determined whether an ON state of the head light switch has been input or not, namely, whether the head light of the vehicle is lit or extinguished. In the case that the determination result is negative, it is determined that the vehicle periphery is bright. Accordingly, in this case, the routine is terminated without execution of the processing after step 300. On the other hand, when the determination result is positive, it is determined that the vehicle periphery is dark, and thus the routine proceeds to step 302.

In step 302, processing is executed that causes the near-infrared LED 24 to emit light. Once the processing of step 302 has been executed, thereinafter, the imaged zone of the camera 10 is illuminated by the near-infrared LED 24.

In step 304, it is determined whether the side turn signal light 18 is flashing, and further, whether the timing of the side turn signal light 18 is in a lit period. In the case that the determination result is negative, the side turn signal light 18 is extinguished. Accordingly, it can be determined that even if the side turn signal light 18 in the camera image is displayed as is on the display 12, the user will not find the camera image dazzling. Thus, next, the processing of step 306 is executed. On the other hand, if the determination result is positive, the side turn signal light 18 is lit. Accordingly, if the camera image is displayed as is on the display 12, the user will find the camera image dazzling. As a result, next, the processing of step 308 is executed.

In step 306, processing is executed that opens the shutter of the camera 10. Once the processing of step 306 has been executed, thereinafter, light is incident on the camera 10 and it is possible to obtain a shot image from the camera 10. In step 308, processing is executed that closes the shutter of the camera 10. Once the processing of step 308 has been executed, thereinafter, light incident on the camera 10 is blocked, and it is not possible to obtain a shot image from the camera 10. Following completion of the processing of step 306 or step 308 as described above, next, the processing of step 310 is executed.

In step 310, processing is executed that outputs and displays the shot image from the camera 10 on the display 12. More particularly, in the case that the shot image from the camera 10 is obtained from the processing of step 306, this camera image is displayed on the display 12. On the other hand, in the case that the shot image from the camera 10 is obtained from the processing of step 308, display is continued of the camera image obtained immediately prior to that point, or alternatively, display on the display 12 is interrupted. Once the processing of step 310 is completed, the routine on this occasion is terminated.

According to the routine shown in FIG. 7, when the vehicle periphery is illuminated by the near-infrared LED 24, the shutter of the camera 10 can be switched between open and closed in synchronization with the flash cycle of the side turn signal light 18. More particularly, it is possible to maintain the shutter in an open state when the side turn signal light 18 is extinguished, and on the other hand, close the shutter when the side turn signal light 18 is lit.

When the shutter of the camera 10 is closed, light incident upon the camera 10 is blocked, and imaging by the camera 10 is not executed. Accordingly, with this embodiment, if the side turn signal light 18 is lit during flashing thereof when the near-infrared LED 24 is illuminating the imaged zone at night, it is possible to achieve the dazzle inhibiting effect for the camera image displayed on the display 12 by preventing display of the shot image in which the side turn signal light 18 included within the imaged zone of the camera 10 has a dazzling appearance. Accordingly, it is possible to maintain good viewability of the camera image for the user of the vehicle, regardless of whether the side turn signal light 18 is lit or extinguished.

With this embodiment, the dazzle inhibiting effect for the camera image as described above is achieved by controlling opening and shutting of the shutter of the camera 10. With the configuration as described above, in order to achieve the dazzle inhibiting effect of the camera image, an already provided shutter may be electronically controlled to open and close. Accordingly, it is not necessary to execute any modification to the physical structure of the camera 10 or the side turn signal light 18. Given this, with the system according to this embodiment, when the side turn signal light 18 is lit, it is possible to achieve the dazzle inhibiting effect for the camera image at low cost.

Further, by achieving the dazzle inhibiting effect of the camera image when the side turn signal light 18 is lit in the above manner, it is possible to maintain the dazzle inhibiting effect even if the sensitivity of the camera 10 to infrared component is raised. Thus, according to this embodiment, as with the configurations of the above described first and second embodiments, it is possible to raise the sensitivity of the camera 10 to infrared component amply, whereby it is possible to improve the viewability of the camera image at night.

Moreover, with the third embodiment, regardless of the operation position of the door mirror 14, the shutter of the camera 10 is closed when the side turn signal light 14 is lit while the imaged zone is illuminated by the near-infrared LED 24. Given this, with the system according to this embodiment it is possible to ensure that the dazzle inhibiting effect for the camera image is achieved, regardless of the operation position of the door mirror 14.

Note that in the above described embodiment, execution of the processing of steps 308 and 310 of the routine shown in FIG. 7 by the ECU 200 may be regarded as equivalent to "display control means" of the invention.

Next, a fourth embodiment of the invention will be explained with reference to FIG. 8.

In the above described third embodiment, the dazzle inhibiting effect for the camera image is achieved by controlling opening and closing of the shutter of the camera 10. In contrast to this, with the fourth embodiment, the dazzle inhibiting effect for the camera image is achieved by variably controlling an aperture size of the camera 10.

Figure 8:
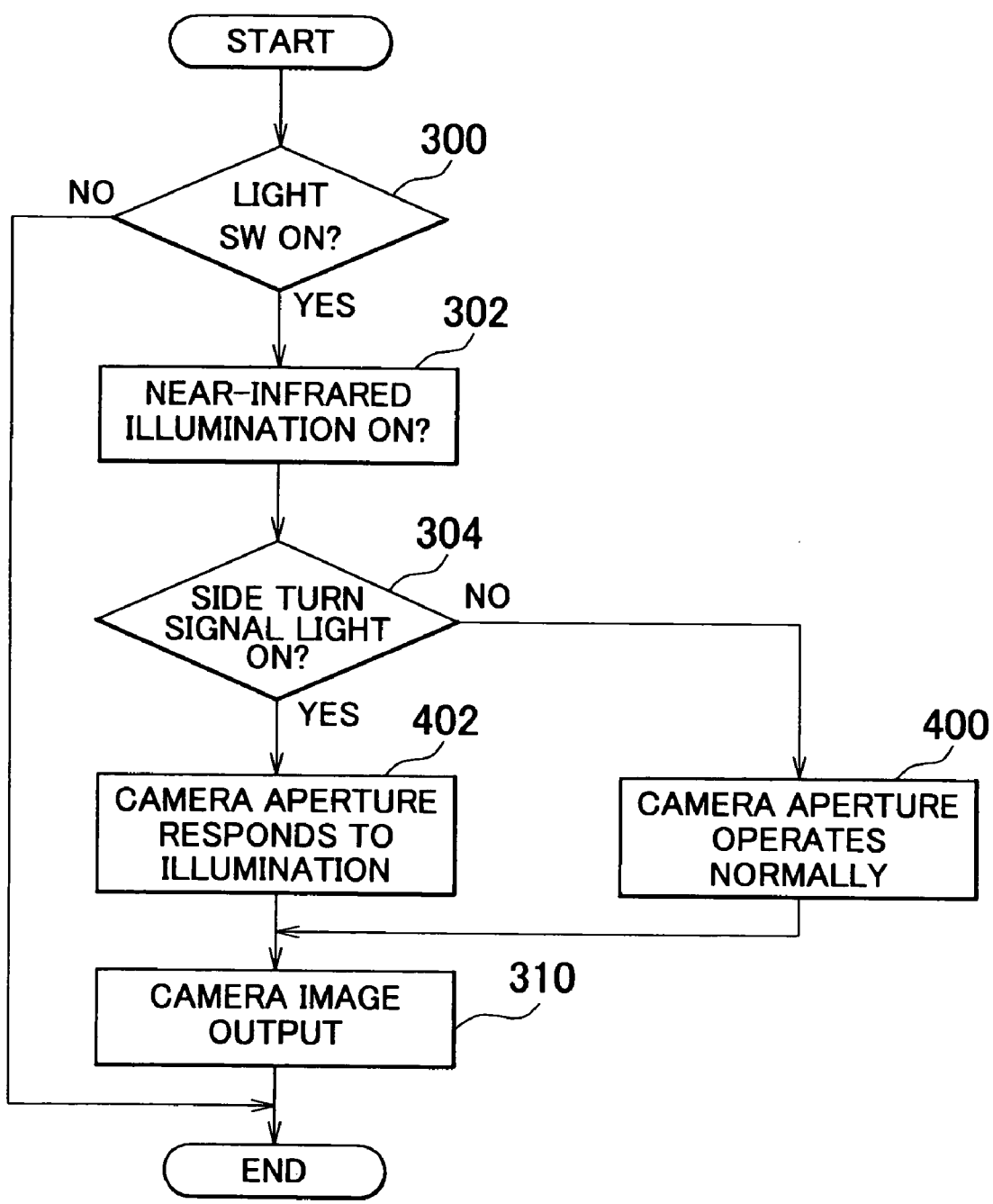
FIG. 8 is a flow chart of a control routine executed by a vehicle periphery monitoring device according to a fourth embodiment.

In the system of the fourth embodiment, the camera control portion 216 of the configuration shown in FIG. 6 executes the routine shown in FIG. 8 instead of that shown in FIG. 7. In other words, the camera control portion 216 varies the aperture size of the camera 10 in synchronization with the flash cycle of the side turn signal light 18. More particularly, during the extinguished period of the side turn signal light 18, the aperture size is controlled in a normal manner in accordance with a periphery illumination intensity when the near-infrared LED 24 is lit. On the other hand, when the lit period is identified by the timing adjustment portion 214, the aperture size is controlled in accordance with a periphery illumination intensity that results from both the near-infrared light 24 and the side turn signal light 18 being lit, and thus the aperture size is made larger than during the extinguished period.

When the aperture of the camera 10 is closed-down, as compared to when it is opened-up, the amount of light that is incident on the camera 10 is restricted. Accordingly, in the configuration according to this embodiment, the aperture size of the camera 10 is varied depending on whether the side turn signal light 18 is extinguished or lit, such that the aperture is opened-up when the side turn signal light 18 is extinguished, and is closed-down when the side turn signal light 18 is lit. Further, with this configuration, when the side turn signal light 18 is flashing, the shot image displayed on the display 12 during the lit period accords with the illumination intensity at that time.

As a result, with the system according to this embodiment, when the side turn signal light 18 is lit during night imaging, it is possible to prevent display on the display 12 of a shot image in which the side turn signal light 18 included within the imaged zone of the camera 10 has a dazzling appearance. Accordingly, it is possible to achieve the dazzle inhibiting effect for the camera image that is displayed on the display 12.

FIG. 8 is a flow chart that shows an example of a control routine that is executed by the ECU 200 of this embodiment in order to achieve the above described function. The routine shown in FIG. 8 is repeatedly started at a predetermined cycle (for example, every 30 ms). Note that steps of FIG. 8 that execute the same processing as equivalent steps of FIG. 7 are denoted with the same reference numbers, and thus an explanation thereof is either omitted or simplified.

In other words, in the routine shown in FIG. 8, in the case that the determination result of step 304 is negative, next, the processing of step 400 is executed; however, in the case that the determination result is positive, next, the processing of step 402 is executed.

In step 400, processing is executed such that the aperture size of the camera 10 is controlled in a normal manner to be in accordance with the illumination intensity when the near-infrared LED 24 is lit. Further, in step 402, processing is executed such that the aperture size of the camera 10 is controlled to be in accordance with the illumination intensity that results from both the near-infrared LED 24 and the side turn signal light 18 being lit. Once the processing of step 400 or step 402 is completed, next, the processing of step 310 is executed, whereby a shot image that accords with the aperture size of the camera 10 is displayed on the display 12.

According to the routine shown in FIG. 8, it is possible to variably switch the aperture size of the camera 10 in synchronization with the flash cycle of the side turn signal light 18 while the vehicle periphery is illuminated by the near-infrared LED 24. In particular, when the side turn signal light 18 is extinguished, the aperture size is maintained at its normal size, and when the side turn signal light 18 is lit, the aperture size is set to be larger than normal.

When the aperture of the camera 10 is closed-down, as compared to when it is opened-up, the amount of light that is incident on the camera 10 is restricted. Accordingly, with this embodiment, if the side turn signal light 18 is lit during flashing thereof when the near-infrared LED 24 is illuminating the imaged zone at night, it is possible to prevent display of a shot image in which the side turn signal light 18 included within the imaged zone of the camera 10 has a dazzling appearance. Accordingly, it is possible to achieve the dazzle inhibiting effect for the camera image displayed on the display 12. Given this, it is possible to amply increase the sensitivity of the camera 10 to infrared component, and it is possible to improve the viewability of the camera image at night.

With this embodiment, the dazzle inhibition effect for the camera image is achieved by variably controlling the aperture size of the camera 10. With the above described configuration, in a similar manner to the configuration of the third embodiment, in order to achieve the dazzle inhibiting effect of the camera image an already provided aperture of the camera 10 may be variably controlled in an electronic manner. Accordingly, it is not necessary to execute any modification to the physical structure of the camera 10 or the side turn signal light 18. Given this, with the system according to this embodiment, when the side turn signal light 18 is lit, it is possible to achieve the dazzle inhibiting effect for the camera image at low cost.

Further, with this embodiment, regardless of the operation position of the door mirror 14, the aperture of the camera 10 is closed-down if the side turn signal light 14 is lit when the imaged zone is illuminated by the near-infrared LED 24. Given this, it is possible to ensure that the dazzle inhibiting effect for the camera image is achieved, regardless of the operation position of the door mirror 14.

Note that, in the fourth embodiment, the execution of the processing of steps 402 and 310 of the routine shown in FIG. 8 by the ECU 200 may be regarded as equivalent to "display control means" of the invention.

Note that, in the fourth embodiment, the aperture size of the camera 10 is variably controlled in order to obtain the dazzle inhibiting effect of the camera image. However, at the same time, the position of the side turn signal light 18 in the camera image is set and fixed in advance. Accordingly, control may be executed such that the aperture is varied in accordance with the position of the side turn signal light 18 in the imaged zone. In this case as well, the aperture of the camera 10 is opened-up in synchronization with extinguishing of the side turn signal light 18, and is closed-down in synchronization with lighting thereof, whereby it is possible to obtain the dazzle inhibiting effect for the camera image.

Further, in the above described fourth embodiment, the illumination control portion 210 executes control such that when the head light switch is ON the near-infrared LED 24 is constantly caused to light up, whereby the imaged zone is illuminated. When the side turn signal light 18 is lit during such illumination, the aperture of the camera 10 is controlled to close-down such that the aperture size is in accordance with the periphery illumination intensity that results from both the near-infrared LED 24 and the side turn signal light 18 being lit. However, control may also be executed such that even if the head light switch is ON, the near-infrared LED 24 is extinguished during the lit period of the side turn signal light 18, and the aperture size of the camera 10 is controlled in accordance with a periphery illumination intensity that results from just the side turn signal light 18 being lit. In this case, interruption of lighting of the near-infrared LED 24 when the side turn signal light 18 is lit which is executed by the ECU 200 may be regarded as corresponding to "illumination control means" of the invention.

Moreover, in order to obtain the dazzle inhibition effect for the camera image, a polarized filter may be provided that only shields light from an imaged position of the side turn signal light 18 within the shot image of the camera 10, and the shot image that is imaged by the camera 10 may be passed through this polarized filter. Note that, the position of the side turn signal light 18 within the camera image is fixed in advance. Accordingly, with the above described configuration, when the side turn signal light 18 is lit, incidence of the near-infrared component of the light on the camera 10 is controlled, and this element of the light components is excluded from the shot image. Accordingly, with the configuration described above, when the side turn signal light 18 is lit, it is possible to inhibit the side turn signal light 18 within the shot image displayed on the display 12 from having a dazzling appearance, whereby it is possible to obtain the dazzle inhibiting effect of the camera image. Note that, the position of the side turn signal light 18 within the camera image is different when the door mirror 14 is in the deployed position, as compared to the stored position. Accordingly, it is favorable if the polarized filter has a light shielding position that can be varied to correspond with the operation position of the door mirror 14.

Further, in the first to fourth embodiment described above, the camera 10 with the imaged zone that includes the side turn signal light 18 is positioned on the door mirror 14 whose operation position can be changed. However, the configuration of the invention is not limited to this, and the camera 10 may be disposed on a door mirror whose operation position cannot be changed, a side door, or the like.

According to the above embodiments, when the side turn signal light is lit, the infrared light component which is generated therefrom and which is incident on the camera is inhibited from becoming excessive, whereby it is possible to achieve the dazzle inhibiting effect for the shot image.

Further, according to the above embodiments, when the side turn signal light is lit, display of the shot image that is imaged by the camera on the display is inhibited, whereby it is possible to achieve the dazzle inhibiting effect for the shot image.

Moreover, according to the above embodiments, when the side turn signal light is lit, it is possible to achieve inhibition of display of the shot image on the display by stopping the camera from imaging the vehicle side zone.

According to the above embodiments, when the side turn signal light is lit, it is possible to inhibit display of the shot image on the display by closing-down the aperture of the camera.

According to the above embodiments, when the side turn signal light is lit, the side turn signal light itself does not directly appear on the display, whereby it is possible to achieve the dazzle inhibiting effect of the shot image.

According to the above embodiments, when the side turn signal light is lit, light generated form the side turn signal light is inhibited from being incident on the camera, whereby it is possible to achieve the dazzle inhibiting effect of the shot image.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A turn signal light for a vehicle, comprising:
    a bulb that emits a flashing light as a result of operation of a turn switch or hazard switch of the vehicle; and
    a component that reduces infrared light of the flashing light and that transmits the visible light of the flashing light,
    wherein the infrared light reduction member is at least one of an infrared light reduction coating that is applied to the lamp bulb, an infrared light reducing film that is attached to a lens that covers the lamp bulb, and an infrared light reducing filter plate that is disposed between the lamp bulb and the lens.

2. A vehicle periphery monitoring device comprising:
    an imaging unit which is sensitive to infrared light and which is disposed such that a vehicle side zone including a turn signal light provided on a vehicle body side surface can be imaged;
    a display unit that displays a shot image that is imaged by the imaging unit; and
    a display control portion that inhibits display on the display unit of the shot image from the imaging unit when the turn signal light is lit.

3. The vehicle periphery monitoring device according to claim 2, wherein the imaging unit opens and closes a shutter provided in the imaging unit in synchronization with flashing of the turn signal light.

4. The vehicle periphery monitoring device according to claim 2, wherein the imaging unit changes an aperture size of an aperture provided in the imaging unit in synchronization with flashing of the turn signal light.

5. The vehicle periphery monitoring device according to claim 4, further comprising:
    an illumination portion that illuminates an imaged zone that is imaged by the imaging unit with near-infrared light; and
    an illumination control portion that controls illumination of the illumination portion, wherein the illumination control portion interrupts illumination of the illumination portion when the turn signal light is lit.

6. The vehicle periphery monitoring device according to claim 5, wherein the illumination control portion causes the illumination portion to be constantly lit when a head light switch is in an on state, and if the turn signal light is lit when the illumination portion is executing illumination, the illumination control portion controls the aperture size of the aperture by closing-down the aperture such that the aperture size accords with a periphery illumination intensity generated by the illumination portion and the turn signal light being lit.

7. The vehicle periphery monitoring device according to claim 5, wherein the illumination control portion causes, even if the head light switch is in the on state, the illumination portion to be extinguished during a period in which the turn signal light is lit, and controls the aperture size of the aperture such that the aperture size accords with a periphery illumination intensity generated by just the turn signal light being lit.

8. A vehicle body construction comprising:
    an imaging unit which is sensitive to infrared light and which images a vehicle side zone including a turn signal light provided on a vehicle body side surface;
    a display unit that displays a shot image that is imaged by the imaging unit; and
    a shielding portion that shields a direct optical path that connects the turn signal light and the imaging unit.

9. The vehicle body construction according to claim 8, wherein the shielding portion is provided in at least one of the turn signal light and the imaging unit.

10. A vehicle imaging device comprising:
    an imaging unit which is sensitive to infrared light and which images a vehicle side zone including a turn signal light provided on a vehicle body side surface; and
    a polarized filter disposed at a position to block infrared light received by the imaging unit from an imaged area of the turn signal light, wherein:
    the imaging unit is provided on a movable part of the vehicle; and
    the polarized filter is provided such that, even if the imaging unit is moved in accordance with movement of the movable part of the vehicle, the position of the polarized filter can be moved so as to constantly correspond with an imaged position of the turn signal light.

11. A vehicle periphery monitoring device comprising:
    imaging means which is sensitive to infrared light and which is disposed such that a vehicle side zone including a turn signal light provided on a vehicle body side surface can be imaged;
    display means that displays a shot image that is imaged by the imaging means; and
    display control means that inhibits display on the display unit of the shot image from the imaging means when the turn signal light is lit.

12. A vehicle body construction comprising:
    imaging means which is sensitive to infrared light and which images a vehicle side zone including a turn signal light provided on a vehicle body side surface;
    display means that displays a shot image that is imaged by the imaging means; and
    shielding means that shields a direct optical path that connects the turn signal light and the imaging means.

* * * * *